United States Patent
Bishop et al.

(10) Patent No.: US 10,436,224 B2
(45) Date of Patent: Oct. 8, 2019

(54) METHOD AND APPARATUS FOR BALANCING A ROTOR

(71) Applicant: General Electric Company, Schenectady, NY (US)

(72) Inventors: Michael Jason Bishop, Mason, OH (US); Kevin Lee Kirkeng, Milford, OH (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 15/088,803

(22) Filed: Apr. 1, 2016

(65) Prior Publication Data

US 2017/0284419 A1    Oct. 5, 2017

(51) Int. Cl.
| | | |
|---|---|---|
| *F01D 5/30* | (2006.01) | |
| *F04D 29/66* | (2006.01) | |
| *F04D 29/32* | (2006.01) | |
| *F04D 29/34* | (2006.01) | |
| *F04D 29/64* | (2006.01) | |
| *F01D 5/02* | (2006.01) | |
| *F16F 15/32* | (2006.01) | |
| *G01M 1/36* | (2006.01) | |

(52) U.S. Cl.
CPC ........... *F04D 29/662* (2013.01); *F01D 5/027* (2013.01); *F04D 29/327* (2013.01); *F04D 29/34* (2013.01); *F04D 29/644* (2013.01); *F04D 29/666* (2013.01); *F16F 15/322* (2013.01); *G01M 1/36* (2013.01); *F05D 2260/75* (2013.01); *Y02T 50/672* (2013.01); *Y02T 50/673* (2013.01)

(58) Field of Classification Search
CPC ...... F04D 29/662; F04D 29/644; F04D 29/34; F04D 29/327; F04D 29/666; F01D 5/027; F01D 5/10; F01D 5/30; F01D 5/3007; G01M 1/36; F16F 15/322
See application file for complete search history.

(56) References Cited

U.S. PATENT DOCUMENTS

| | | | |
|---|---|---|---|
| 3,736,811 A | 6/1973 | Neary | |
| 3,888,601 A | 6/1975 | Glassburn | |
| 4,477,226 A * | 10/1984 | Carreno | ................ F01D 5/027 416/144 |

(Continued)

FOREIGN PATENT DOCUMENTS

| | | |
|---|---|---|
| EP | 0 699 824 A1 | 3/1996 |
| EP | 2 014 869 A1 | 1/2009 |

(Continued)

OTHER PUBLICATIONS

Extended European Search Report and Opinion issued in connection with corresponding EP Application No. 17161251.8 dated Oct. 12, 2017.

*Primary Examiner* — Ninh H. Nguyen
*Assistant Examiner* — Maxime M Adjagbe
(74) *Attorney, Agent, or Firm* — Dority & Manning, P.A.

(57) ABSTRACT

A turbomachinery rotor apparatus includes: a rotatable disk having an array of slots spaced around its periphery; an array of blades installed in the slots, wherein the blades have variable weights; and a plurality of connection components installed in the disk, each connection component forming a portion of a mechanical joint between one of the blades and its respective slot, wherein the connection components have variable weights.

16 Claims, 5 Drawing Sheets

(56) References Cited

U.S. PATENT DOCUMENTS

| | | | | |
|---|---|---|---|---|
| 5,018,943 | A | * | 5/1991 | Corsmeier ............. F01D 5/027 416/144 |
| 5,282,720 | A | * | 2/1994 | Szpunar ................. F01D 5/323 416/220 R |
| 5,474,421 | A | * | 12/1995 | Rossmann ............... F01D 5/26 416/203 |
| 5,611,669 | A | | 3/1997 | Royle |
| 8,186,961 | B2 | * | 5/2012 | Stone .................... F01D 5/3092 416/221 |
| 8,322,991 | B2 | * | 12/2012 | MacFarlane ........... F01D 5/027 416/144 |
| 8,616,850 | B2 | * | 12/2013 | Ward .................... F01D 5/3007 416/204 A |
| 8,701,286 | B2 | | 4/2014 | Strother |
| 8,974,185 | B2 | | 3/2015 | Franks |
| 8,974,681 | B2 | | 3/2015 | Rodriquez Elizondo et al. |
| 2012/0301238 | A1 | | 11/2012 | Quinn et al. |
| 2015/0192144 | A1 | * | 7/2015 | Murdock ............... F01D 5/323 416/220 R |

FOREIGN PATENT DOCUMENTS

| | | |
|---|---|---|
| EP | 2 395 200 A2 | 12/2011 |
| GB | 2 105 790 A | 3/1983 |
| GB | 2 408 296 A | 5/2005 |

* cited by examiner

METHOD AND APPARATUS FOR BALANCING A ROTOR

BACKGROUND OF THE INVENTION

This invention relates generally to rotating mechanical elements such as rotor disks, and more specifically to balancing of rotors in turbomachinery.

A gas turbine engine includes a turbomachinery core having a high pressure compressor, combustor, and high pressure turbine in serial flow relationship. The core is operable in a known manner to generate a primary flow of propulsive gas. A typical turbofan engine adds a low pressure turbine driven by the core exhaust gases which in turn drives a fan rotor through a shaft to generate a bypass flow of propulsive gas. In the case of a high bypass engine this provides the majority of the total engine thrust.

The fan rotor includes an array of fan blades extending radially outward from a fan disk. During operation of the engine, it is important that the rotor be statically and dynamically balanced. Any substantial rotary unbalance within the fan rotor can cause undesirable mechanical loads in the fan rotor as well as connected components such as bearings, bearing supports, and fan support frames. This excessive loading can lead to shortened life and/or component failure.

A rotor may be balanced by assembling the blades in the rotor so that their mass is distributed as evenly about the circumference as possible. The rotor may be further balanced by installing one or more trim weights in selected locations. For example, if a specific blade is heavier, then one or more trim weights would be installed in the rotor at a location opposite to the heavy blade.

A desire exists to increase fan bypass ratios. As bypass ratios increase, the fan diameter increases and/or the hub flowpath diameter decreases. One problem relating to such fan rotor configurations is that existing fan balance weight configurations may not be capable of removing all unbalance caused by a heavy blade.

BRIEF DESCRIPTION OF THE INVENTION

This problem is addressed by the present invention, which provides a rotor in which balance weights are incorporated into a mechanical connection of the blades to the rotor.

According to one aspect of the technology described herein, a turbomachinery rotor apparatus includes: a rotatable disk having an array of slots spaced around its periphery; an array of blades installed in the slots, wherein the blades have variable weights; and a plurality of connection components installed in the disk, each connection component forming a portion of a mechanical joint between one of the blades and its respective slot, wherein the connection components have variable weights.

According to another aspect of the technology described herein, a fan rotor apparatus includes: a rotatable fan disk having a forward end and an aft end, and an array of dovetail slots spaced around its periphery; an array of fan blades carried by the fan disk, where each fan blade includes an airfoil and a dovetail, wherein the dovetail is received in one of the dovetail slots, and wherein the blades have variable weights; and a plurality of dovetail keys installed in the dovetail slots, each dovetail key filling a radial gap between the respective blade and the slot, wherein the dovetail keys have variable weights.

According to another aspect of the technology described herein, a method of balancing a turbomachinery rotor includes: inserting an array of blades into an array of slots formed in a rotatable disk, wherein the blades have variable weights; determining an imbalance of the assembled blades and disk; and inserting a spacer into each of the slots, such that each spacer forms a portion of a mechanical joint between one of the blades and its respective slot, wherein the spacers each have an individual weight, and wherein the individual weights of the spacers are selected to correct at least a portion of the imbalance.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
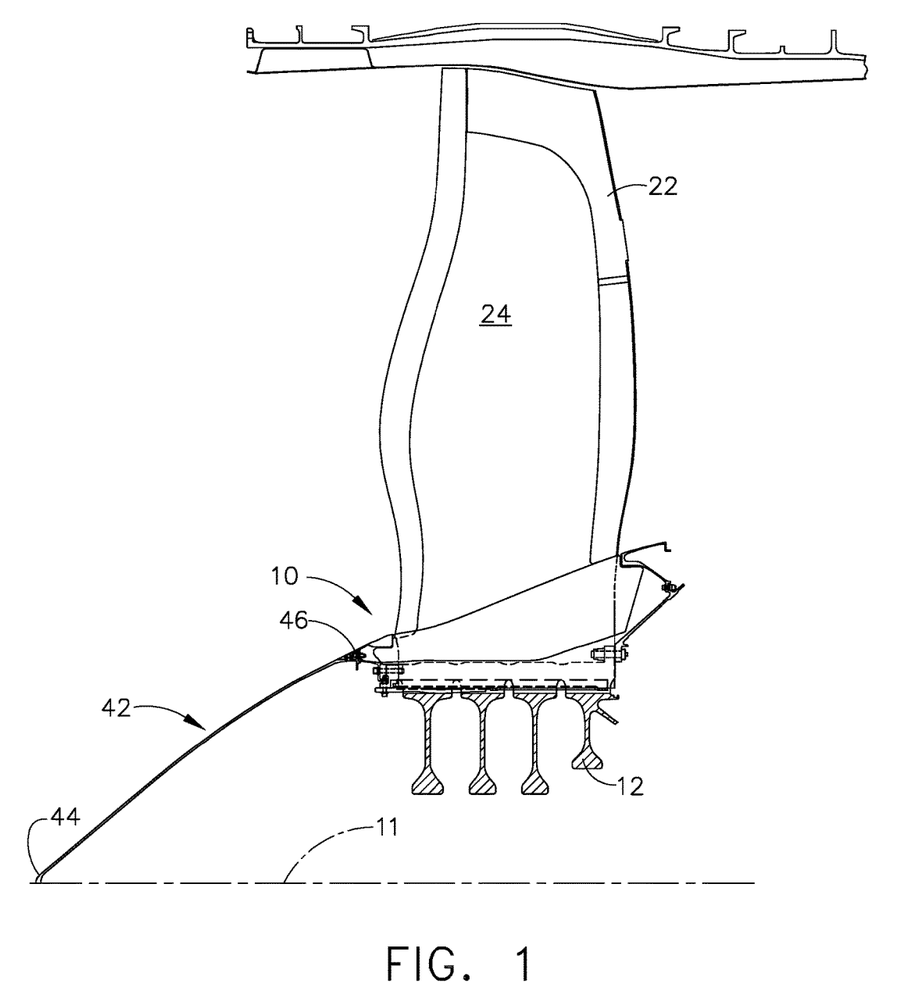
FIG. 1 is a partially-sectioned side elevation view of a fan rotor of a gas turbine engine.
Figure 2:
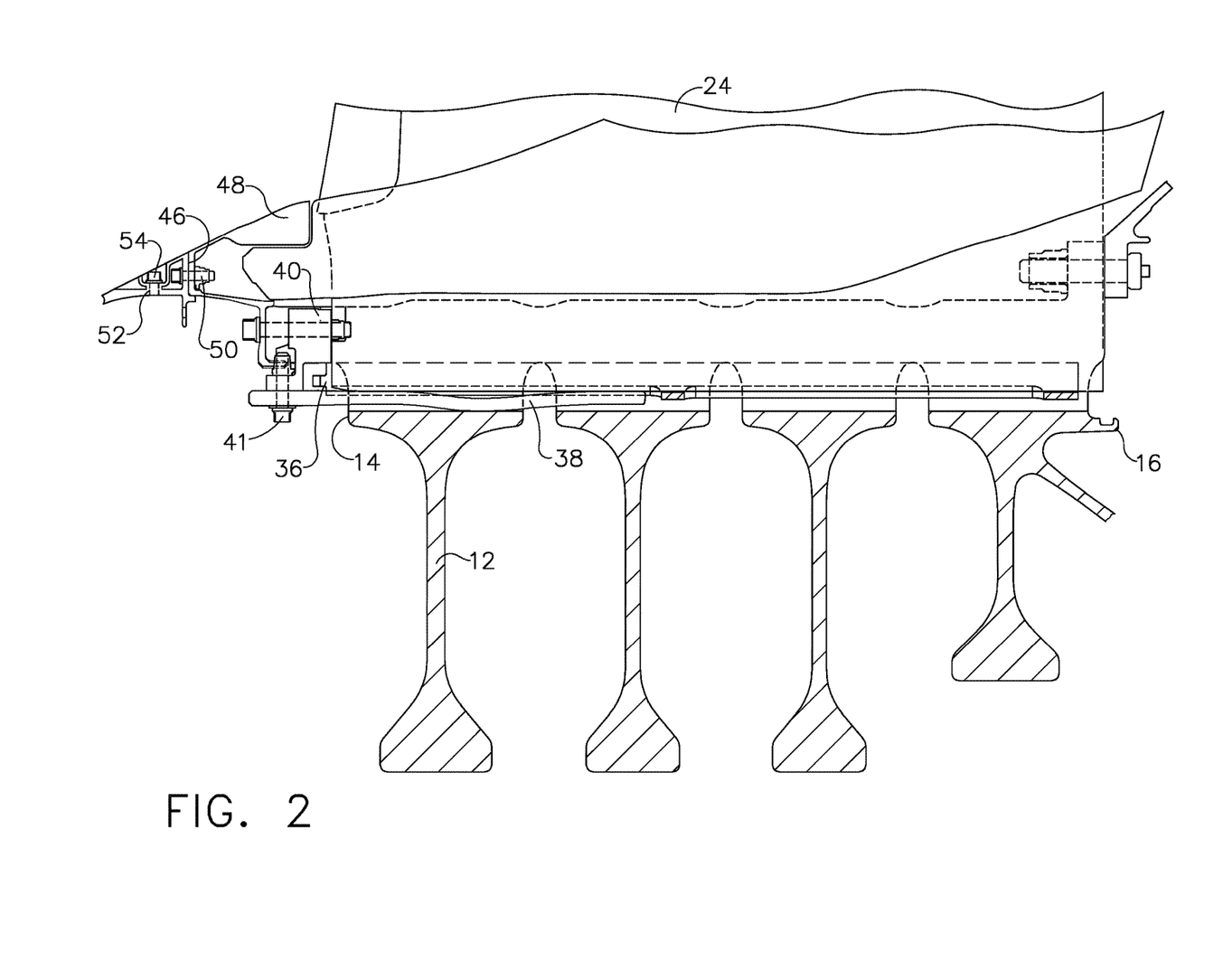
FIG. 2 is an enlarged view of a portion of the fan rotor shown in FIG. 1.
Figure 3:
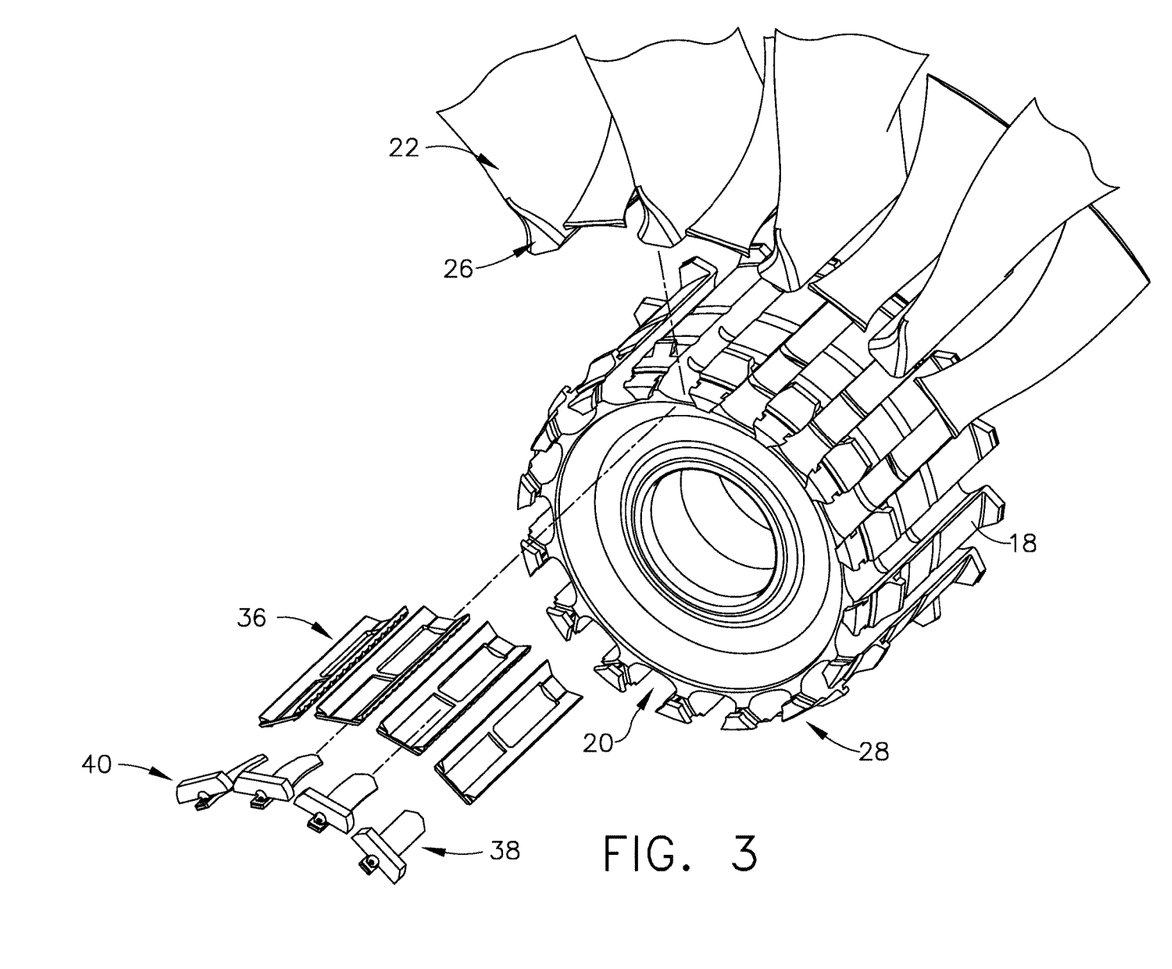
FIG. 3 is an exploded perspective view of the fan rotor shown in FIG. 1.

Referring to the drawings wherein identical reference numerals denote the same elements throughout the various views, FIGS. 1-3 depict a fan rotor 10 which forms a part of a high-bypass gas turbine engine. It will be understood that the principles described herein are equally applicable to other types of turbine engines, as well as to other types of rotating mechanical elements that require balancing.

Figure 7:
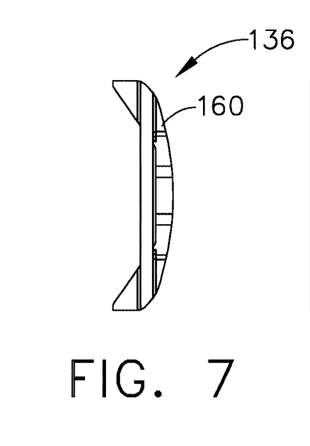
FIG. 7 is a front elevation view of the dovetail key of FIG. 6.
Figure 8:
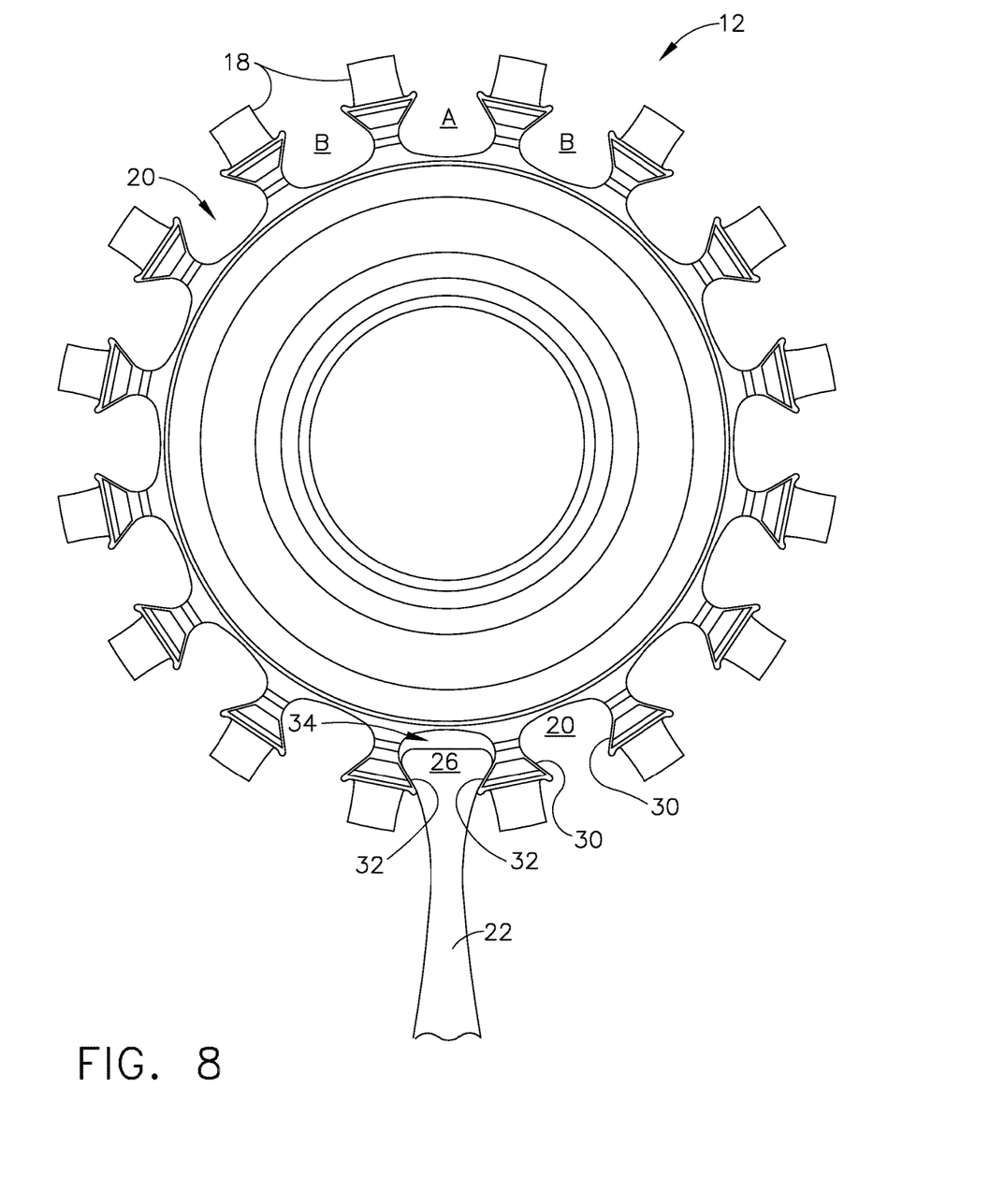
FIG. 8 is a front elevation view of a rotor having an exemplary blade installed therein.

The fan rotor 10 comprises a fan disk 12 including a forward end 14 and an aft end 16. The fan disk 12 is mounted for rotation about an axis 11 and is coupled to a driving shaft in accordance with conventional practice (not shown). As seen in FIG. 7, the fan disk 12 includes an annular array of dovetail posts 18 alternating with dovetail slots 20. An array of fan blades 22 are mounted to the fan disk 12. Each fan blade 22 includes an airfoil 24 with an axial dovetail 26 at its root. For purposes of describing the present invention, the fan rotor 10 is generically representative of any turbomachinery rotor having a disk carrying an array of blades.

Each dovetail post 18 includes a finger 28 extending axially forward (see FIG. 3). Each dovetail slot 20 includes a pair of converging faces 30 that mate with a corresponding pair of pressure faces 32 of the respective dovetail 26. When a fan blade 22 is mounted in a dovetail slot 20, there is a radial gap 34 present between the base of the dovetail 26 and a radially-inner boundary of the dovetail slot 20.

As seen in FIGS. 2 and 3, a dovetail key 36 is inserted into the dovetail slots 20 to fill the radial gap 34 and thereby to prevent the fan blade 22 from moving radially during low RPM engine operation, when centrifugal load is not capable of overcoming gravitational loads on the fan blade 22. The dovetail key 36 is thus an example of a "spacer" in the context of the fan rotor 10. More generally, the term "spacer" refers to any element with partially or wholly fills a gap between other components in an assembly. The structure of the dovetail key 36 is described in more detail below.

A spring 38 is disposed in the dovetail slot 20. The spring 38 is a leaf-type spring with a shallow "U" shape and is configured to apply radially outward pressure against the fan blade 22.

A retainer 40 is disposed adjacent the forward end 14 of the fan disk 12 between adjacent fingers 28. The spring 38 and the retainer 40 are clamped to each other using a mechanical fastener, for example the illustrated bolt 41. Thus assembled, the fan blade 22, the retainer 40, the dovetail key 36, and the spring 38 form a closed mechanical loop which retains the fan blade 22 in the dovetail slot 20. Stated another way, each of the retainer 40, dovetail key 36, and spring 38 is a "connection component" which defines part of a mechanical joint between the fan blade 22 and the fan disk 12.

A spinner 42 (FIGS. 1 and 2) is provided which functions as an aerodynamic fairing for the fan rotor 10. The spinner 42 is a body of revolution and is generally hollow with a nose 44 disposed on the axis 11 and a mounting flange 46 that abuts an adapter ring 48 which is mounted to the fan disk 12. In the illustrated example the cross-sectional shape of the spinner 42 is roughly conical, but other shapes are also used. The spinner 42 is attached to the adapter ring 48, for example using the illustrated bolts 50.

The spinner 42 includes an array of trim bolt pockets 52 which receive trim bolts 54, as described in more detail below.

As noted above, the fan rotor 10 must be statically and dynamically balanced to within predetermined limits in order to have acceptable vibration and component life. In balancing the fan rotor 10, the mass of each component as well as its radial distance from the axis 11 is significant. The product of the two values is a parameter referred to as "moment weight". The fan rotor 10 balancing process utilizes known measuring equipment which can detect and quantify imbalance in a rotating assembly. The fan blades 22 have a variable weight, that is, the actual weight of each individual fan blade 22 may be more or less than a nominal design value. When considering the fan rotor 10 as a whole, the fan blades 22 generally are the source of the greatest variation in mass, and accordingly the greatest variation in moment weight.

Typically, the most significant change in the rotor balance is obtained by interchanging or swapping fan blades 22 to different positions; for example if two relatively heavy fan blades 22 are present, they would generally be positioned diametrically opposite to each other.

A final correction or offset of imbalance may be obtained by using the trim bolts 54 described above. Conventionally, trim bolts are placed in one or more of the trim bolt pockets 52 to complete the final balance of the fan rotor 10. In some situations, the variation in weight of the fan blades 22 from blade to blade may be greater than can be balanced solely by using the trim bolts 54 described above.

Figure 4:
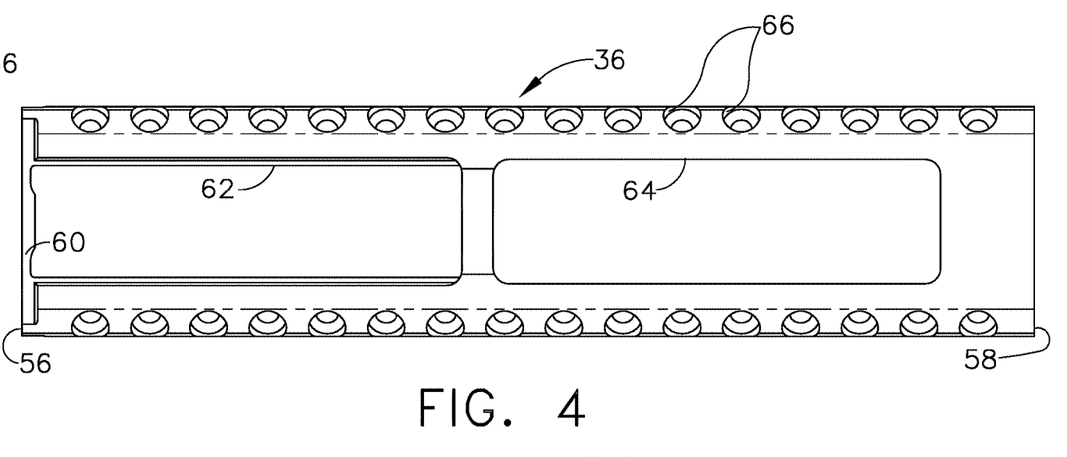
FIG. 4 is a top plan view of a dovetail key for use with the fan rotor of FIG. 1.
Figure 5:
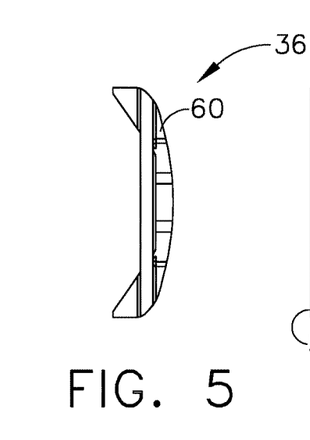
FIG. 5 is a front elevation view of the dovetail key of FIG. 4.

To address this shortfall, the dovetail key 36 may be used as a variable balance weight. An exemplary dovetail key 36 having a baseline configuration is shown in FIGS. 4 and 5. The dovetail key 36 is a relatively thin, elongated structure with forward and aft ends 56 and 58, respectively. A flange 60 is disposed at the forward end 14. The dovetail key 36 is generally rectangular in plan view. Its cross-sectional shape may be varied as necessary to fit into the dovetail slots 20. A clearance slot 62 is machined through the dovetail key 36 adjacent the forward end 14. When the fan rotor 10 is assembled, a portion of the spring 38 rests in the clearance slot 62. The dovetail key 36 may include one or more weight-reduction features. As used herein, the term "weight-reduction feature" refers to an area or volume where material is removed with the effect of reducing the weight of the component, without affecting its interface dimensions as described below. In the example illustrated in FIGS. 4 and 5, a weight-reduction window 64 is machined through the dovetail key 36 adjacent the aft end 58. Also in this example, a plurality of weight-reduction pockets 66 in the form of blind holes are formed in the dovetail key 36. Both the window 64 and the pockets 66 are examples of weight-reduction features. The dovetail key 36 may be manufactured from any material having adequate strength for expected loads in operation. Non-limiting examples of suitable materials include metal alloys, polymers, and composite materials. In a baseline configuration the material chosen would generally be of low density to minimize the weight of the dovetail key 36.

In order to function properly in the assembled fan rotor 10 described above, each dovetail key 36 must have a common set of exterior dimensions. For example, the length, width, and radial thickness must all be sized to properly fit in the dovetail slots 20. These dimensions are referred to herein as the "interface dimensions" of the dovetail key 36. However, the weight of the dovetail key 36 may be varied from a nominal or baseline value while maintaining the interface dimensions.

Figure 6:
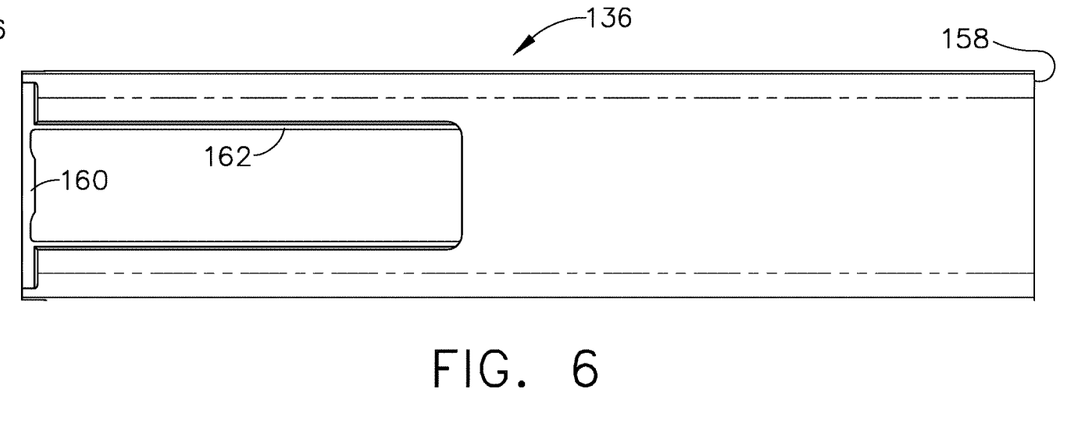
FIG. 6 is a top plan view of an alternative dovetail key.

For example, FIGS. 6 and 7 illustrate an alternative dovetail key 136. It is similar to the dovetail key 136 described above and includes forward and aft ends 156 and 58, respectively, a flange 160, and a clearance slot 162. Unlike the dovetail key 36 described above, no weight-reduction features are incorporated, so the weight of the dovetail key 136 is greater than the weight of the dovetail key 36.

Using specific choices of materials, or weight-reduction features, or combinations of features and material selection, it is possible to provide a selection of dovetail keys having different weights. For example, if the dovetail key 136 is made from a dense material its weight could be approximately four times the weight of the baseline dovetail key 36 incorporating all weight-reduction features and being made of low-density material. Different weight increments between the two extremes may be implemented by including or removing features individually.

As part of a rotor balancing procedure, a correction or offset of imbalance may be obtained by using different dovetail keys. The dovetail keys must be installed before the spinner 42 is installed, however adding or removing dovetail keys does not require removing or otherwise disturbing the installed fan blades 22. This is possible because there is a clear, unobstructed physical path by which the dovetail keys can be inserted or removed in an axial direction.

The variable weight dovetail key would generally be employed by initially placing a lightweight baseline dovetail key 36 described above all positions within the fan disk 12, and by replacing one or more of the lightweight dovetail keys 36 with a heavier dovetail key in a position opposite to a heavier fan blade. Various methods are possible for installation. For example, FIG. 7 depicts the fan disk 12 with a single fan blade 22, assumed to be relatively heavy, installed in a 6 o'clock position. To counterbalance the fan blade 22, a single heavier dovetail key could be installed position "A" at 12 o'clock, directly opposite the fan blade 22. Alternatively, one or more heavier dovetail keys could be placed at locations flanking the 12 o'clock position, as indicated at "B", to provide an intermediate effect.

Subsequent to installation of the variable weight dovetail keys, a final correction or offset of imbalance may be obtained by using the trim bolts 54 described above.

The balancing apparatus and method described herein has several advantages over prior art. The use of the dovetail key component as a balance weight permits more significant weight changes as compared to prior art usage of trim bolts only. At the same time, this balancing method does not require the introduction of new components, and only uses components which are already required as part of a complete assembly for structural retention of the existing fan blades 22.

The principles described herein may be applied to other components and/or other rotating elements. For example, such elements as the retainer 40 described above or the springs 38 could be configured to have a variable weight as described above for the dovetail keys. All of these components share the common feature that they form a part of the mechanical connection of the fan blade 22 to the fan disk 12 and can be removed or installed without disturbing the blade 22.

The foregoing has described a balancing apparatus and method for a rotor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A turbomachinery rotor apparatus comprising:
a rotatable disk having an array of slots spaced around its periphery;
an array of blades installed in the slots, wherein at least one blade of the array of blades has an actual weight which is more or less than a nominal design value; and
a plurality of connection components installed in the disk, each connection component forming a portion of a mechanical joint between one of the blades and its respective slot, wherein the plurality of connection components comprises a plurality of dovetail keys, a plurality of retainers, and a plurality of springs, wherein the plurality of dovetail keys have a uniform set of exterior interface dimensions and a baseline weight, wherein at least one dovetail key of the plurality of dovetail keys has a weight equal to the baseline weight, and wherein at least one dovetail key of the plurality of dovetail keys has a weight greater than the baseline weight, and wherein each of the plurality of dovetail keys prevent a radial inward movement of each blade of the array of blades.

2. The apparatus of claim 1 wherein the disk and the connection components are configured such that one of the connection components can be installed or removed from the disk without removing any of the blades.

3. The apparatus of claim 1 wherein at least one dovetail key of the plurality of dovetail keys includes weight-reduction features and at least one dovetail key of the plurality of dovetail keys does not include weight-reduction features.

4. The apparatus of claim 1 wherein at least one dovetail key of the plurality of dovetail keys is made from a first material having a first density and at least one dovetail key of the plurality of dovetail keys is made from a second material having a second density greater than the first density.

5. The apparatus of claim 1, wherein each dovetail key is disposed between a dovetail and the spring, such that the spring applies a radially outward pressure to the blade through the dovetail key.

6. A fan rotor apparatus comprising:
a rotatable fan disk having a forward end and an aft end, and an array of dovetail slots spaced around its periphery;
an array of fan blades carried by the fan disk, where each fan blade includes an airfoil and a dovetail, wherein the dovetail is received in one of the dovetail slots, and wherein at least one blade of the array of blades has an actual weight which is more or less than a nominal design value; and
a plurality of connection components installed in the fan disk, each connection component forming a portion of a mechanical joint between each of the fan blades and its respective dovetail slot, wherein the plurality of connection components comprises a plurality of dovetail keys, a plurality of retainers, and a plurality of springs, wherein each of the plurality of dovetail keys is installed in one of the dovetail slots between the dovetail and the spring, each dovetail key filling a radial gap between one of the fan blades and its respective slot and preventing a radial inward movement of the fan blade, wherein the plurality of dovetail keys have a uniform set of exterior interface dimensions and a baseline weight, wherein at least one dovetail key of the plurality of dovetail keys has a weight equal to the baseline weight, and wherein at least one dovetail key of the plurality of dovetail keys has a weight greater than the baseline weight.

7. The apparatus of claim 6 wherein at least one dovetail key of the plurality of dovetail keys includes weight-reduction features and at least one dovetail key of the plurality of dovetail keys does not include weight-reduction features.

8. The apparatus of claim 6 wherein at least one dovetail key of the plurality of dovetail keys is made from a first material having a first density and at least one dovetail key of the plurality of dovetail keys is made from a second material having a second density greater than the first density.

9. The apparatus of claim 6 wherein the dovetail slots are configured such that at least one dovetail key of the plurality of dovetail keys can be installed or removed from the fan disk without removing any of the blades.

10. The apparatus of claim 6 further comprising a spinner attached to the forward end of the fan disk.

11. The apparatus of claim 10 further comprising at least one trim bolt carried by the spinner.

12. A method of balancing a turbomachinery rotor, comprising:

inserting an array of blades into an array of slots formed in a rotatable disk, wherein at least one blade of the array of blades has an actual weight which is more or less than a nominal design value;

determining an imbalance of the assembled blades and disk; and inserting a spacer into each of the slots, such that each spacer forms a portion of a mechanical joint between one of the blades and its respective slot, wherein the spacer has an elongated structure with forward and aft ends, and a flange disposed at the forward end, wherein the spacers each have an individual weight, and wherein the individual weights of the spacers are selected to correct at least a portion of the imbalance, and wherein all the spacers have uniform exterior interface dimensions, wherein the spacer prevents the respective fan blade from moving radially inward;

inserting a spring into each of the slots between the rotatable disk and the spacer so as to exert a radially outward pressure on each of the blades through the respective spacer.

13. The method of claim 12 wherein some of the spacers include weight-reduction features and others of the spacers do not include weight-reduction features.

14. The method of claim 12 wherein some of the spacers are made from a first material having a first density and others of the spacers are made from a second material having a second density.

15. The method of claim 12 wherein the slots are configured such that the spacers can be installed or removed without removing any of the blades.

16. The method of claim 12 further comprising:

mounting a spinner to the disk; and installing at least one trim bolt into the spinner, wherein the at least one trim bolt is selected to correct at least a portion of any remaining imbalance.

* * * * *